United States Patent [19]

Gillespie

[11] 4,276,265
[45] Jun. 30, 1981

[54] SCREEN FOR COLLECTION AND DISTRIBUTION OF PROCESS STREAMS

[75] Inventor: George A. Gillespie, Coon Rapids, Minn.

[73] Assignee: UOP Inc., Des Plaines, Ill.

[21] Appl. No.: 107,490

[22] Filed: Dec. 26, 1979

[51] Int. Cl.³ .............................. B01J 8/00; B01J 8/12; B01J 8/44

[52] U.S. Cl. ................................. 422/311; 34/57 A; 55/494; 55/518; 210/497.1; 210/498; 210/497.01; 422/143; 422/216; 422/218

[58] Field of Search ............... 422/143, 216, 218, 311, 422/211; 166/232, 233, 236, 237; 34/57 A; 432/58; 210/455, 484, 497 R, 497.1, 498; 55/390, 494, 518, 387

[56] References Cited

U.S. PATENT DOCUMENTS

| | | | |
|---|---|---|---|
| 1,930,128 | 10/1933 | Lund | 210/497 X |
| 2,046,458 | 7/1936 | Johnson | 210/497.1 X |
| 2,609,888 | 9/1952 | Beringer | 55/494 X |
| 3,027,244 | 3/1962 | Byrne et al. | 422/218 |
| 3,706,536 | 12/1972 | Greenwood et al. | 422/216 X |
| 4,068,713 | 1/1978 | McGuire | 210/497.1 X |
| 4,090,852 | 5/1978 | Dowd | 422/143 |
| 4,096,911 | 6/1978 | Geske | 166/234 |

*Primary Examiner*—Bradley Garris
*Attorney, Agent, or Firm*—James R. Hoatson, Jr.; Barry L. Clark; William H. Page, II

[57] ABSTRACT

Screen for use in collecting and/or distributing process flow streams has profiled surface wires welded to channel-shaped support members and is preferably made by helically wrapping and welding a profiled surface wire around the elongated channel members which are rotated about the screen axis to produce a cylindrical slotted screen which is then cut along a line parallel to its axis, flattened, and either used flat or rerolled and welded at right angles to its original direction so that the channels form hoop-like supports. The channels are preferably apertured to such an extent that the total open area for an inlet stream flow on the channel side of the screen is less than the open area of the slots on the wire side of the screen. Also, it should be noted that the outer edge of each leg portion of each of the channel members is positioned so close to the outer edge of a leg portion of an adjacent channel member that substantially all of the process stream will flow through the aperatures. Thus, the pressure drop through the screen is controlled by the apertures in the channels with the result that the screen surface can be provided with slot widths of optimum size relative to the particle size of material to be contacted thereby.

8 Claims, 7 Drawing Figures

SCREEN FOR COLLECTION AND DISTRIBUTION OF PROCESS STREAMS

BACKGROUND OF THE INVENTION

The invention relates to screens for use in process flow stream applications where a significant pressure drop through the screen is often essential to provide adequate distribution. This use is quite different from well screen applications where it is usually desirable to maximize the amount of open area and provide a minimum pressure drop. An example of a conventional well screen can be seen in Johnson U.S. Pat. No. 2,046,458 wherein a profiled wire is helically wrapped around a plurality of longitudinal rods and welded to each one so as to define slots of a predetermined width between the successive wraps of wire. Where it is desired to use such a screen in an application requiring a substantial pressure drop through the screen, some of the slots may be welded closed or a perforated pipe or a plate that has been punched and rolled can be mounted inside the screen. Geske U.S. Pat. No. 4,096,911 discloses a cylindrical well screen which incorporates a plurality of apertured channel members having short leg portions which are welded to each wrap of wire, the area of the apertures preferably being at least as great as the open area of the slots. The channels are positioned longitudinally of the screen cylinder and parallel to its axis so as to resist large torsional loads in deep drilling which might destroy a screen of the conventional rod and wire type.

A typical example of a process application where a screen is used to retain catalyst particles is the moving bed reactor shown in Greenwood et al U.S. Pat. No. 3,706,536. In FIG. 9 of the patent a screen is shown as being backed up with a perforated baffle plate. The screen slots are sized to retain the catalyst and the baffle plate has perforations which distribute the reactant stream uniformly through the system and control its flow rate. The open areas of the screen and plate could rarely be the same since it is by having a smaller open area in the baffle plate that a sufficient back pressure is built up in the reactant stream to cause the stream to contact all of the catalyst uniformly. A similar need to retain particles and control distribution would also occur in a fluidized bed. Although it is theoretically possible to make the screen slots small enough to provide a significant pressure drop, it would be very difficult and expensive to achieve very small openings and such small openings might be very susceptible to clogging.

SUMMARY

It is among the objects of the present invention to provide an efficient screen for use in collecting a process flow stream and distributing it uniformly. It is an additional object to provide such a screen which will be strong, lightweight, and easy to fabricate. These and other objects are achieved by the improved screen of the present invention which comprises a surface portion made of a plurality of profiled wires and a support portion made of a plurality of channel members which have legs which abut each other and are welded to each of the wires. The open area for stream flow on the channel side of the screen is less than the open area of the slots defined by the wires. Where the screen is used in cylindrical form, the wires are parallel to the screen axis while the channels are arranged in a hoop-like manner with their ends welded together which makes the cylinder extremely resistant to collapse.

DETAILED DESCRIPTION OF THE PREFERRED EMBODIMENTS

Figure 1:
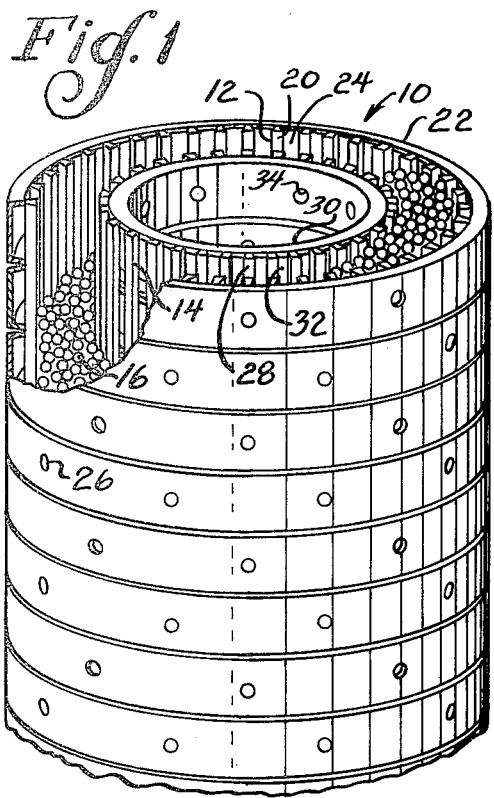
FIG. 1 is a fragmentary, partially broken away, perspective view of a portion of a radial flow catalytic reactor utilizing channel-based screens made in accordance with the present invention.

FIG. 1 illustrates the use of my improved screens in a radial flow catalytic reactor, a portion of which is indicated generally at 10. The reactor includes an outer screen member 12 having an inwardly facing screen surface and an inner screen member 14 having an outwardly facing screen surface. Catalyst, in the form of pellets 16 or other shapes, is contained between the facing screen surfaces. The catalyst is retained against outward radial movement by the profiled wires 20 which are welded to channel shaped members 22 at a uniform spacing to define flow passages or slots 24, as more clearly seen in FIG. 7. For clarity in the drawings, the slots 24 are shown to be wider than they would actually be for the size of pellets 16 shown in FIG. 1. For example, a typical pellet 16 would have a diameter of 0.062" while the slot openings 24 would be about 0.030". The wire profiles 20 would typically have a flat pellet engaging surface having a width of about 0.090" and a depth of about 0.150". The side walls would have about a 13° taper angle and the channels 22 could be about 0.500" wide and 0.35" high with a metal thickness of about 14–16 gauge.

Gas stream flow through a reactor of the type shown in FIG. 1 is typically in a radially inward direction. To distribute the gas stream flow uniformly through the entire bed of catalyst pellets 16, it is necessary to create a small degree of back pressure on the inlet side of the bed or on the outlet side. Back pressure on the inlet side can be accomplished by sizing and spacing the inlet apertures 26 in screen 12 so that their total area will be less than the total area of the slots 24. Thus, approximately the same volume of flow will pass through each of the many apertures 26 and be diffused by the slots 24 and pellets 16 adjacent said aperture.

The pellets 16 are retained against inward radial movement by the screen 14 which comprises profiled wire surfaces 28 which are supported by a plurality of channel shaped members 30 to which they are welded so as to define slots 32. When back pressure is produced by the apertures 26 in inlet screen 12, the area of the apertures 34 in the downstream screen 14 should preferably be greater than the area of the upstream apertures 26 so that no unnecessary back pressures are introduced. However, it is greatly preferred to have back pressure controlled by the smaller diameter inner screen since it is less costly to do so. Thus, in FIG. 1, where the stream is flowing radially inwardly, the total area of the apertures 34 would be less than the total area of the apertures 26. Also, it should be noted that the outer edge of each leg portion of each of the channel members is positioned so close to the outer edge of a leg portion of an adjacent channel member that substantially all of the process stream will flow through the apertures. The profiled wires 20 and 28 are shown as being parallel to the axis of the reactor 10. This arrangement is quite important, especially in a moving bed reactor wherein it is desirable to move the catalyst pellets 16 downwardly through the reactor by the action of gravity with a minimum of attrition. The screens 12, 14 are preferably rolled to the shape shown in FIG. 1 from a flat configuration and have the ends of all of the channels 22, 30 welded to each other so as to greatly enhance the hoop strength of the screens and their resistance to collapse from system pressures or the weight of the catalyst as compared to prior art screens having wire supports.

Figure 2:
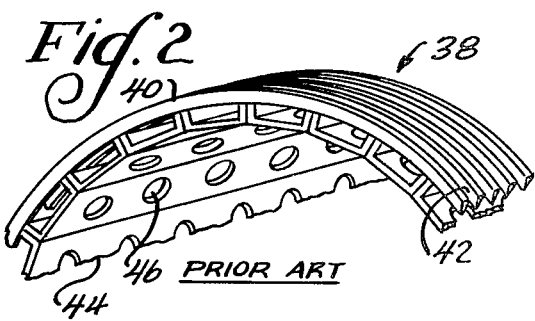
FIG. 2 is a fragmentary view of a prior art channel-based well screen.

FIG. 2 illustrates a prior art well screen 38 disclosed in Geske U.S. Pat. No. 4,096,911 which is made by helically wrapping and simultaneously welding a length of profiled wire 40 having screen openings or slots 42 about a plurality of axially parallel channel members 44 which include apertures 46 which preferably have an open area greater than the area of the slots. The flow through such a screen is normally from the outside to the inside.

Figure 3:
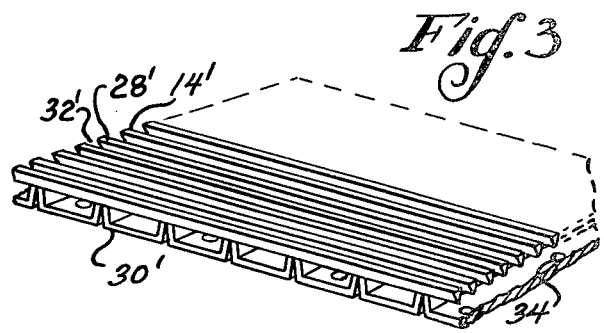
FIG. 3 shows a channel-based screen which has been initially formed in a fashion similar to the FIG. 2 screen and then flattened.
Figure 4:
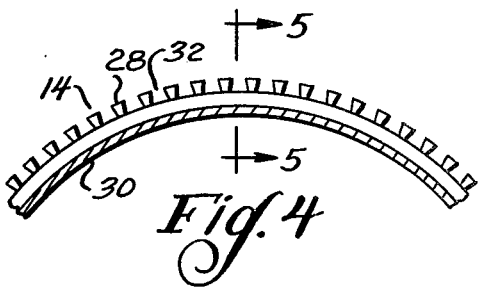
FIG. 4 shows the screen of FIG. 3 after it has been rerolled at right angles with the channels on the inside.
Figure 5:
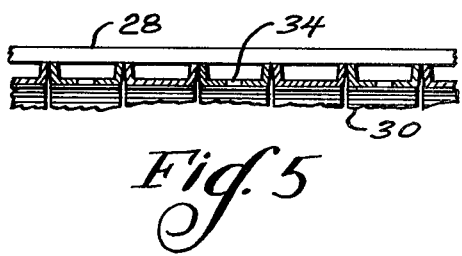
FIG. 5 is a cross-section taken on line 5—5 of FIG. 4.
Figure 7:
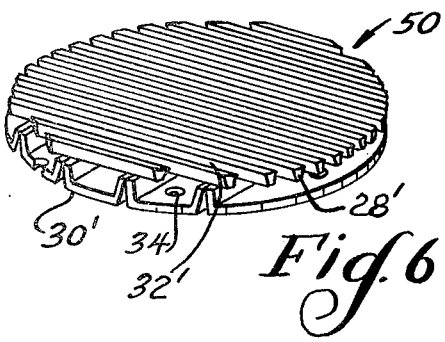
FIG. 7 is a view similar to FIG. 4 where the screen of FIG. 3 has been rerolled with the channels on the outside.
Figure 6:
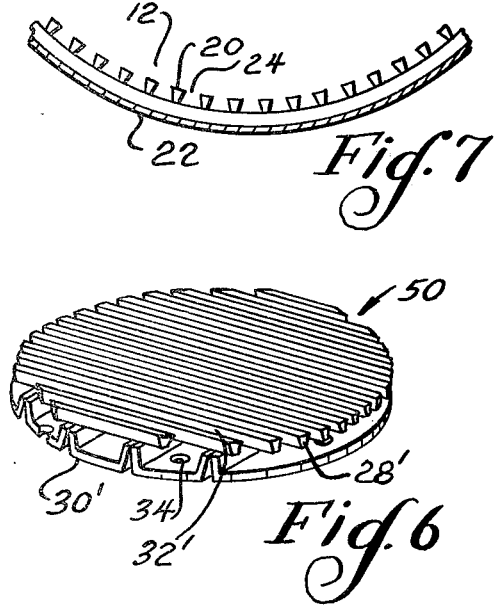
FIG. 6 shows a screen in accordance with the invention of a type useful in a fluidized bed, for example.

FIG. 3 illustrates a flat screen 14' which may be rolled with the wires 28' facing outwardly and welded to form the cylindrical screen 14 shown in FIGS. 1, 4 and 5, rolled with the wires 28' facing inwardly to form the cylindrical screen 12 shown in FIGS. 1 and 7, or used flat as shown at 50 in FIG. 6. The flat screen 14' could be formed by welding a plurality of straight lengths of profiled wires 28' to channels 30' having apertures 34 preformed therein or by wrapping and welding the wire to first produce a configuration similar to that shown in FIG. 2, cutting the resulting screen parallel to its axis, and flattening it.

FIG. 6 shows a circular flat screen 50 which could be formed by cutting the flat screen 14' of FIG. 3. Such a screen is quite useful as a bottom support deck in a fluidized bed, for example. In such a unit there is a need for a back pressure to be created to insure even distribution of the gases passing upwardly through the slots 32'. This function is readily performed by the apertures 34. The channel members 30' are also very important in that they can be formed of varying thicknesses of metal and varying depths to achieve any desired degree of support for the screen. The integral combination of ideal slot size, ideal back pressure for uniform flow distribution and mechanical support in a single screen assembly eliminates the need for providing additional flow control plates and the additional support members required in prior art decks.

I claim as my invention:

1. A multiple screen assembly for collecting and distributing a process flow stream uniformly comprising a plurality of spaced apart profiled wire members fixedly mounted relative to each other so as to define a plurality of slots through which the process stream can pass; a plurality of channel members positioned generally normal to said wire members, each of said channel members having a pair of integral leg portions welded to each of said wire members; apertures formed in said channel members, the outer edge of each leg portion of each of said channel members being positioned so close to the outer edge of a leg portion of the adjacent channel member that substantially all the process stream will flow through said apertures; the total open area of said apertures being less than the total open area of said plurality of slots to thereby induce a pressure drop in the process stream which will cause it to be distributed substantially uniformly through the slots which overlie the channel members on the downstream side of the process stream.

2. The screen assembly of claim 1 wherein said assembly is cylindrical with the profiled wire members being parallel to the axis of the cylinder and the channel members being transverse to the axis of the cylinder, each channel member being endless so as to provide a hoop-like support to said wire members.

3. The screen assembly of claim 2 wherein said profiled wire members are on the inside of the cylinder and the channel members are on the outside of the cylinder.

4. The screen assembly of claim 2 wherein said profiled wire members are on the outside of the cylinder and the channel members are on the inside of the cylinder.

5. The screen assembly of claim 1 wherein said assembly is substantially flat.

6. A multiple screen assembly for supporting a bed of particulate matter and distributing a process flow stream to the bed in a relatively uniform manner comprising a plurality of spaced apart profiled wire members fixedly mounted relative to each other so as to define a plurality of slots having a width less than the width of the particulate matter through which the process stream can pass so as to contact said particulate matter; a plurality of channel members positioned generally normal to said wire members, each of said channel members having a pair of integral leg portions welded to each of said wire members; apertures formed in said channel members, the outer edge of each leg portion of each of said channel members being positioned so close to the outer edge of a leg portion of the adjacent channel member that substantially all the process stream will flow through said apertures; the total open area of said apertures being less than the total open area of said plurality of slots and of such size as to induce a pressure drop in the process stream which will cause it to be distributed substantially uniformly through the slots which overlie the channel members on the downstream side of the process stream.

7. The screen assembly of claim 6 wherein said assembly is cylindrical with the profiled wire members being parallel to the axis of the cylinder and the channel members being transverse to the axis of the cylinder, each channel member being endless so as to provide a hoop-like support for said wire members.

8. The screen assembly of claim 6 wherein said assembly is substantially flat.

* * * * *